No. 637,150. Patented Nov. 14, 1899.
C. W. McDONALD.
NECK YOKE CENTER.
(Application filed Aug. 19, 1899.)
(No Model.) 2 Sheets—Sheet 1.
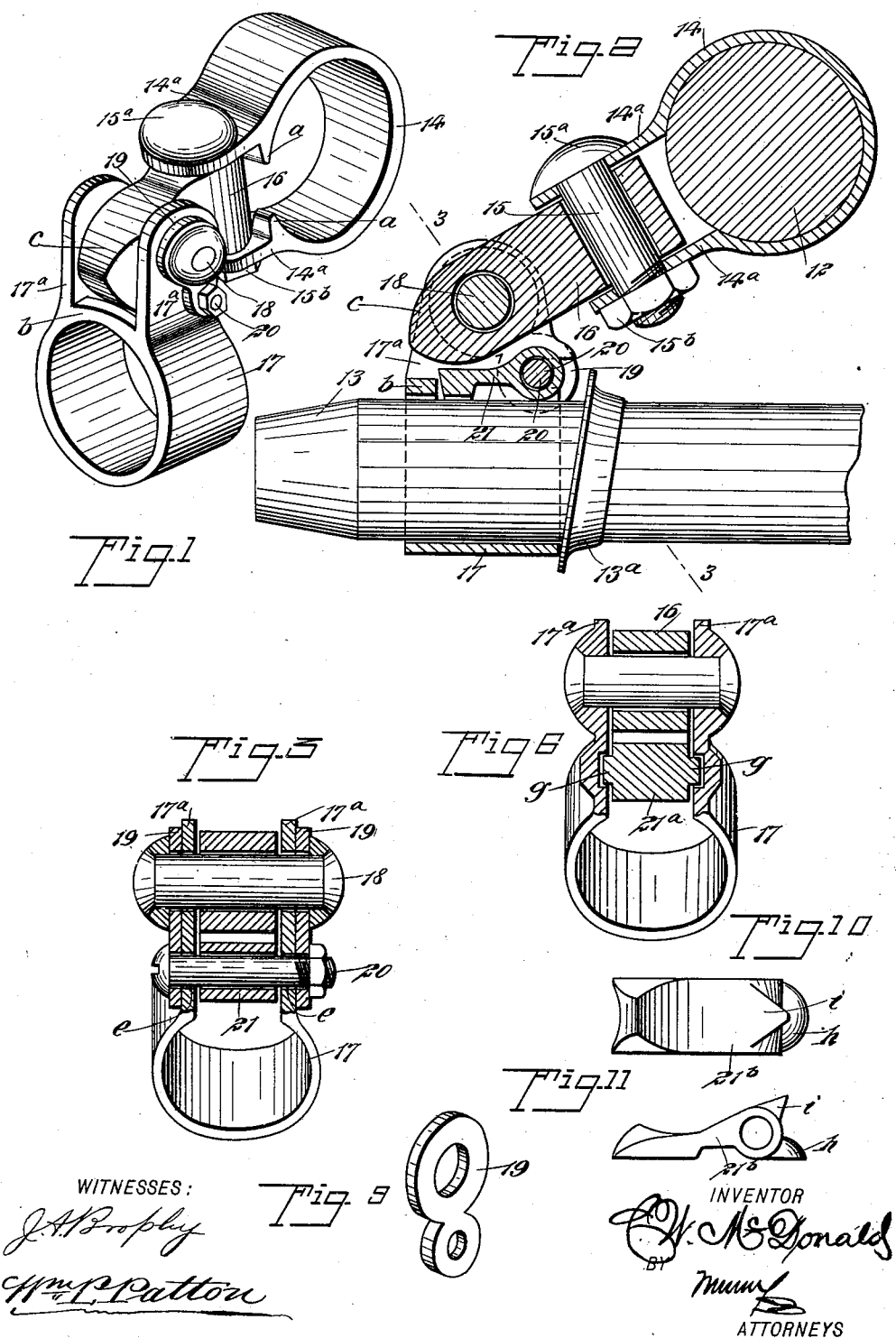
WITNESSES:
INVENTOR
ATTORNEYS No. 637,150. Patented Nov. 14, 1899.
C. W. McDONALD.
NECK YOKE CENTER.
(Application filed Aug. 19, 1899.)
(No Model.) 2 Sheets—Sheet 2.
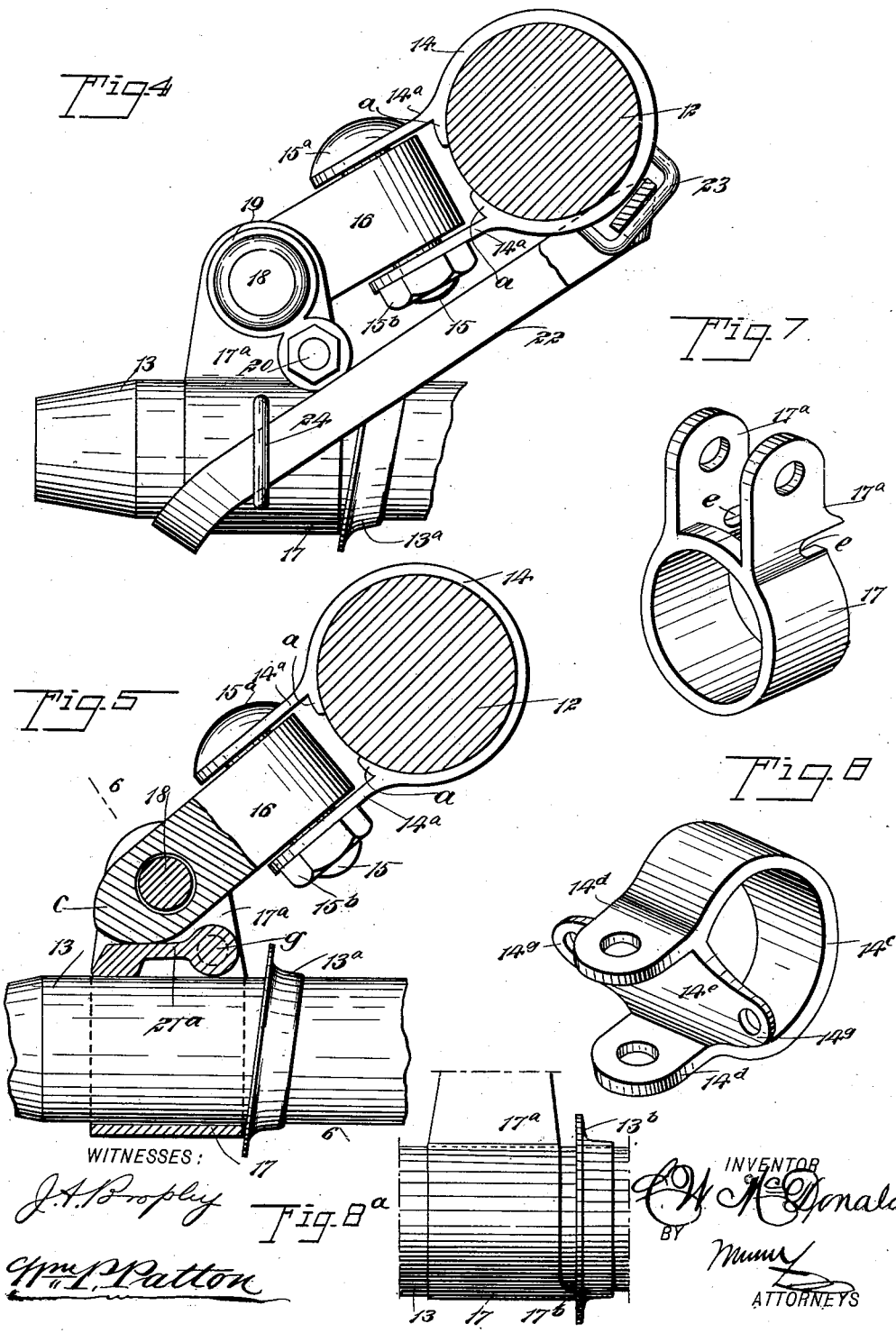

UNITED STATES PATENT OFFICE.

CHARLES WALTON McDONALD, OF GALLATIN, MISSOURI, ASSIGNOR OF ONE-HALF TO GEORGE AID AND FRED AID, OF SAME PLACE.

NECK-YOKE CENTER.

SPECIFICATION forming part of Letters Patent No. 637,150, dated November 14, 1899.

Application filed August 19, 1899. Serial No. 727,803. (No model.)

*To all whom it may concern:*

Be it known that I, CHARLES WALTON MC-DONALD, of Gallatin, in the county of Daviess and State of Missouri, have invented a new and Improved Neck-Yoke Center, of which the following is a full, clear, and exact description.

This invention relates to improved means for the adjustable connection of a neck-yoke or spreader-bar with the pole of a vehicle, and has for its object to provide a neck-yoke connection or center which is of novel and superior construction, that adapts it for highly efficient service.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a perspective view of one form of the improvement. Fig. 2 is a sectional side view of the device shown in Fig. 1 applied upon a spreader-bar and vehicle-pole tip, on the latter of which is a check-ferrule of novel form and constituting a portion of the improvement. Fig. 3 is a transverse sectional view of the neck-yoke center shown in Fig. 1, taken substantially on the line 3 3 in Fig. 2. Fig. 4 is a side view of a neck-yoke center applied upon a vehicle-pole tip and upon a neck-yoke shown in section, this view embodying additional features of the invention. Fig. 5 is a sectional side view of the improvement, showing a modification. Fig. 6 is a transverse sectional view substantially on the line 6 6 in Fig. 5. Fig. 7 is a perspective view of a pole-ring having features of improvement. Fig. 8 is a perspective view of a neck-yoke clip-band of novel form. Fig. 8ª is a side view of the pole-ring slightly modified, a portion of a vehicle-pole whereon the ring is mounted, and a check-collar on said pole against which the pole-ring impinges. Fig. 9 is a perspective view of a bracket-plate which is a feature of the invention. Fig. 10 is a detached plan view of a clamping-dog that is a detail of the invention, and Fig. 11 is a side view of the dog shown in Fig. 10.

In the drawings which represent the improvement, 12 indicates the middle portion of a spreader-bar or neck-yoke, and 13 the forward end portion or tip of a wagon pole or tongue, upon which the neck-yoke is to be loosely secured for service by means of the novel "center" or jointed connecting device.

In Figs. 1, 2, and 3 one advantageous form of construction of the improvement is shown, comprising the following details: The clip-band 14 is in the form of a flat-bodied open ring, having a suitable diameter for clasping engagement with the neck-yoke 12 at its longitudinal center. The end portions of the band 14 are outwardly extended about parallel with each other, thus affording clamping-ears 14ª, which are perforated oppositely for the reception of a bolt 15, having a head 15ª upon one end and a nut 15ᵇ screwed upon the threaded end of the bolt. Between the ears 14ª one end portion of a cam-block 16 is loosely inserted and held to rock laterally by the bolt 15, which passes through a perforation formed in the block a short distance from the end nearest the neck-yoke body, as shown in Fig. 2.

There are two short lips formed on the inner surface of the clip-band 14, which have contact with the neck-yoke 12 when said band is in place thereon, and by the application of a metal punch upon these lips and the use of a hammer they may be bent inwardly, and thus be embedded in the wooden neck-yoke, which will prevent lateral displacement of the clip-band.

The pole-ring 17, which is a coacting member of the neck-yoke center shown in Figs. 1, 2, and 3, is substantially similar in general form to the clip-band 14, and consists, essentially, of a curved band having two flanges 17ª extended in the same direction and spaced apart by the cross-bar *b*, formed at the end of the ring which is nearest to the free end of the pole 13 when the ring is in place thereon. The flanges 17ª are parallel on their inner faces and are separated from each other except where the cross-bar *b* joins them by its connection therewith.

The cam-block 16 projects considerably from the ears 14ª, and this projecting portion fits loosely between the spaced flanges 17ª, where it is held to rock by the cross-bolt 18, that passes through alined perforations in the flanges and block mentioned, as clearly shown in Fig. 3. The free end or toe c of the cam-block 16 is preferably sloped to give it an ovate form, thus providing a convex lower side, as indicated in Figs. 1 and 2.

As shown in Fig. 7, where the detached pole-ring 17 is perspectively represented, and also in Fig. 3, the pole-ring is notched in the edge which is rearward in service, these two opposite notches e being located at the junction of the flanges $17^a$ with the body of the pole-ring 17.

On each end of the bolt 15, that projects outside of the ears $14^a$, similar bracket-plates 19 are hung, one at each side of the pole-ring 17, and held to depend in contact with the flanges $17^a$ by adjustment of the nut $15^b$. The lower ends of the bracket-plates 19 are oppositely perforated for the reception of the pivot-bolt 20, which loosely engages within a transverse perforation formed in the rear end of the clamping-dog 21, the pivot-bolt being slid into the notches e when the described parts are assembled, which will dispose the dog 21 within the pole-ring and below the convex surface of the cam on the forward end of the block 16.

At a suitable distance from the forward extremity of the pole 13 a collar is secured, and this collar may be inclined to the axis of the pole, as shown at $13^a$ in Figs. 2 and 5, or be at right angles thereto, as represented in Fig. $8^a$ at $13^b$.

It will be seen that the impinge of the lower rear edge of the pole-ring will check the rearward movement of said ring upon the pole in either form of the collar; but to avoid excessive friction if the collar is secured at right angles to the axis of the pole a projection $17^b$ may be formed upon the lower portion of the rear edge of the pole-ring 17, which will have but a small surface of contact with the collar $13^b$, and thus avoid objectionable friction between the ring and collar.

In service the weight of the pole 13 is mainly carried by the neck-yoke 12 and is imposed upon the cam-block 16, which causes the toe c of said block to bear with sufficient pressure upon the dog 21 to hold the pole from motion endwise and yet permit the pole-ring to rock sidewise, which, in conjunction with the pivot connection of the cam-block to the clip-band 14, affords freedom of action to the team coupled by the neck-yoke to the pole, and thus avoids discomfort of the animals that is incidental to ordinary neck-yoke connections.

In Fig. 4 it will be observed that I have provided a reinforcing-strap 22, which is an endless band and at one looped end has engagement within a staple 23, projected from the lower side of the clip-band 14, the forward portion of which strap embraces the sides and forward edge of the pole-ring 17, being held in place thereon by two like staples 24, one of which is shown in Fig. 4.

The endless strap 22 serves to aid the dog 21 in holding the pole-ring 17 from slipping forward, particularly when the pole is depressed at the front end while the vehicle is descending a steep hill, and it is also a safeguard in case the dog should slip at any other time.

In Figs. 5 and 6 the clamping-dog $21^a$ there shown is provided with two short trunnions g, which loosely occupy opposite sockets formed in the inner faces of the flanges $17^a$, whereby the rear end of the dog is pivotally engaged with the pole-ring 17 for service, as before explained. When the dog $21^a$ is employed, the cross-bar b is dispensed with, as the flanges $17^a$ must be sprung apart sufficiently to permit the introduction of the trunnions g into the sockets they are to occupy.

In Figs. 10 and 11 the clamping-dog $21^b$ shown is slightly modified in form, having its upper surface concaved for the rocking engagement therewith of the convex lower surface of the toe c on the free end of the cam-block 16. Furthermore, at the rear end of the dog $21^b$ two spurs h and i project rearwardly a short distance, they being separated, as shown in Fig. 11. In the progressive movement of a vehicle up a hill the forward end of the pole thereof is thrown up, at the same time relaxing the bearing of the dog 21 or $21^b$ upon the pole. This disposal of the pole also rocks the cam-block 16 down, so that the front edge of the nut $15^b$ may press upon the rear end of the dog $21^b$ and force the lower spur h down upon the pole, which will prevent an improper slip of the neck-yoke center while the pole is upwardly inclined.

In Fig. 8 a slightly-modified form of the clip-band is shown, this exemplification of the clip-band consisting of the ring $14^c$, having the flanges $14^d$ projected therefrom and perforated to receive a bolt, the ring being rendered intact by a web $14^e$, that extends between the flanges at their point of junction with the body of the ring, said web having laterally-extended ears $14^g$, which will fit upon the forward side of the neck-yoke when the clip-band is placed thereon, and screws may then be inserted through perforations in said ears into the neck-yoke body, whereby the clip-band is held from displacement on the neck-yoke.

It is claimed for this device that it is inexpensive, easy to manufacture by ordinary means, practical, and very efficient in service.

Having thus described my invention, I claim as new and desire to secure by Letters Patent—

1. The combination with a neck-yoke, and a clip-band having two spaced flanges projected therefrom, of a cam-block pivoted between said spaced flanges, a pole-ring also having two spaced flanges between which said cam-block is pivoted at right angles to the other pivot-bolt, and a clamping-dog pivoted so as to lie between the flanges of the pole-ring and receive pressure from a toe on the cam-block.

2. The combination with a neck-yoke, and a clip-band thereon having two spaced flanges projected outwardly therefrom, of a pole-ring having two parallel spaced flanges, a cam-block pivoted between the flanges of the clip-band and also between the flanges of the pole-ring, said cam-block having a convex-faced toe thereon, and a rockable dog pivoted between the flanges of the pole-ring, and pressed upon by the toe of the cam-block.

3. The combination with a neck-yoke, a vehicle-pole, and a collar on said pole, of a clip-band on the neck-yoke, a pole-ring on the vehicle-pole, a cam-block pivoted upon the clip-band and pole-ring, a clamping-dog pivoted upon the pole-ring and pressed upon the pole by an end of the cam-block, and an endless strap engaged with the clip-band and pole-ring to hold the pole-ring in contact with the collar on the pole.

4. The combination with a neck-yoke, and a clip-band thereon having two spaced flanges projected outwardly therefrom, a cam-block pivoted by a bolt between said flanges near one end of said block, of a pole-ring having two spaced flanges thereon, a pivot-bolt passing through said flanges and also through the cam-block, two bracket-plates hung from said pivot-bolt, a clamping-dog pivoted by one end between depending ends of the bracket-plates, a vehicle-pole, and a collar thereon.

5. In a neck-yoke center, the combination with a clip-band, and a cam-block pivoted thereon near one end of a pole-ring also pivoted on the cam-block near its opposite end, and a clamping-dog pivoted to rock on the pole-ring and pressed by a toe on the cam-block.

6. In a neck-yoke center, the combination with a vehicle-pole, of a collar thereon having a downwardly and forwardly sloping face, and a pole-ring rockable laterally on the pole and having a projection at the lower side of its rear edge which is adapted to bear upon the lower forward portion of the collar, thereby reducing frictional resistance to rocking movement of the pole-ring.

7. In a neck-yoke center, the combination with a pole-ring having two spaced flanges projected therefrom, and a cam-block held to rock on the pole-ring, of a clamping-dog having two trunnions oppositely projected near one end thereof, said trunnions occupying sockets formed in the spaced flanges, to permit the free end of the dog to rock when pressed by the cam-block.

8. In a neck-yoke, a clip arranged for attachment to the yoke, a ring adapted to be inserted on the pole, a cam-block connecting the clip and ring, and a clamping-dog pivotally connected to the ring and adapted to be pressed upon by the cam-block, as set forth.

CHAS. WALTON McDONALD.

Witnesses:
J. P. O. GIVENS,
W. H. HARGIS.